Figures 1, 2:
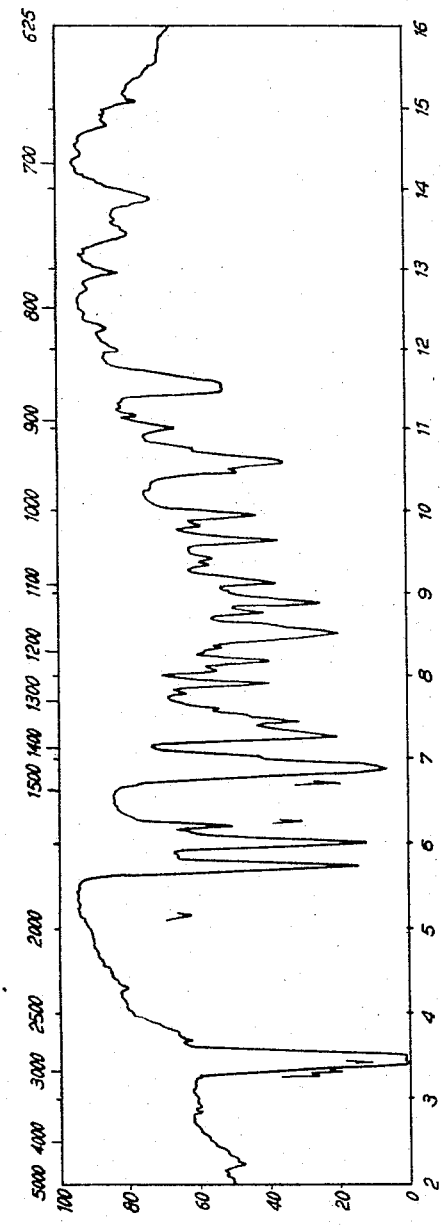

United States Patent Office 3,364,209
Patented Jan. 16, 1968

3,364,209
(20S)-3-KETO-20-HYDROXY-18-OIC LACTONE(→20)-PREGNA-5-ENE AND DERIVATIVES THEREOF
Jean Le Men, Limeil-Brevannes, Seine-et-Oise, France, assignor to Roger Bellon, Charcot, France
Filed Mar. 22, 1961, Ser. No. 97,680
Claims priority, application Great Britain, Mar. 25, 1960, 10,681/60
The portion of the term of the patent subsequent to Dec. 15, 1981, has been disclaimed
8 Claims. (Cl. 260—239.57)

This invention relates to novel paravallarine and dihydroparavallarine derivatives and a process for the preparation thereof.

The applicant has already described paravallarine, which is an alkaloid obtained from *Paravallaris microphylla*, Pitard, see copending patent application Ser. No. 61,163, filed Oct. 7, 1960, and now abandoned. Paravallarine corresponds to (20S)-3β-(N-methylamino)-20-hydroxy-18-oic lactone(→20)-pregna-5-ene of the following formula, in which R represents a hydrogen atom

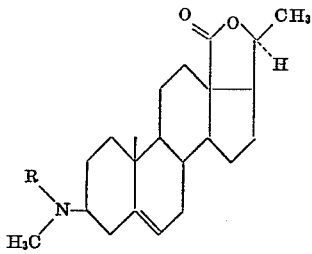

This compound as well as the other compounds described hereinafter are designated according to the Rules of Nomenclature established by Cahn, Ingold, and Prelog ("Experientia," vol. 12, 1956, page 81).

The applicant has moreover prepared different derivatives of paravallarine and, starting from this compound, he has obtained dihydroparavallarine, belonging to the allopregnane series, and conforming to the formula

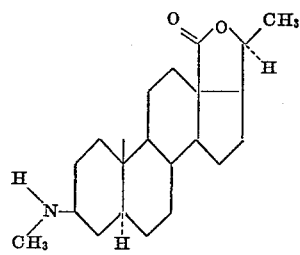

as well as different derivatives of this latter compound. Such derivatives are described in the above mentioned patent application Ser. No. 61,163 and correspond to the following formula:

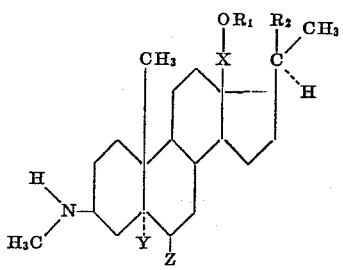

wherein

X is a member selected from the group consisting of methylene and carbonyl;

$R_1$ is a member selected from the group consisting of hydrogen, methyl, and acetyl;

$R_2$ is a member selected from the group consisting of hydroxyl and acetoxy; and Y and Z are members selected from the group consisting of hydrogen and a direct carbon to carbon bond.

Such compounds are, for instance, (20S)-3β-(N-methylamino)-18,20-dihydroxy pregna-5-ene and the like compounds.

The present invention provides a process for the preparation of steroids, which comprises deaminating paravallarine, dihydroparavallarine, or a derivative of either of these compounds having a —NHCH₃ grouping in the 3-position.

This deamination can be carried out in accordance with the method described by H. Ruschig, W. Fritsch, J. Schaidthome and W. Haede (Chem. Ser. 1955, 88, 883).

Accordingly in a first stage, an N-chlorinated derivative of paravallarine, or a derivative thereof, is prepared and, in a second stage, the chloramine which has formed is destroyed, for example by means of a solution of an alkali metal alcoholate in an anhydrous alcohol to form the 3-keto-group on solvolysis.

In order to effect the first stage, it is possible to use N-chlorosuccinimide or hypochlorous acid as chlorinating agent, the reaction taking place in the cold in an anhydrous organic solvent, such as an ether or a chlorinated solvent.

The excess of the chlorinating agent is then eliminated, for example by washing with water and, after having driven off the solvent at a temperature below 40° C., the chloramine which has formed is destroyed in the second stage.

The deaminated products obtained are novel. They are useful in mineral metabolism and are intermediates for the synthesis of cortical hormones as they can be hydroxylated in the 21-position. Furthermore they can serve as intermediates for the preparation of 18-oxygenated steroids, and more particularly steroids comprising a lactone bridge between the 18 and 20 positions of steroids of the pregna-4-ene and allopregnane types. Furthermore, in accordance with the present invention, ketones of the following formula:

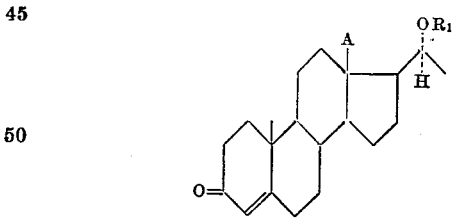

in which $R_1$ represents a hydrogen atom or an acyl radical and A represents a $CH_2OH$ radical, which may be acylated, or an ester radical, can be obtained from the corresponding Δ⁵-derivative of paravallarine.

According to the invention, when starting from 5α-derivatives of dihydroparavallarine, ketones are obtained which correspond to the following formula:

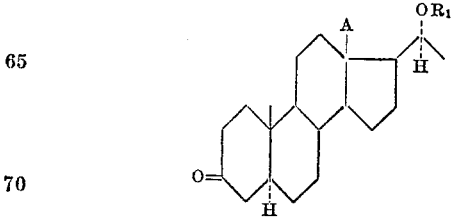

EXAMPLE 1

Preparation of (20S)-3-keto-20-hydroxy-18-oic lactone(→20)-pregna-4-ene

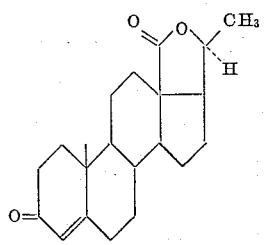

The deamination obtained by the method described below shows that the double bond originally situated at the 5,6-position migrates towards the 4,5-position to form a conjugated compound with the ketone function fixed in the 3-position. This is evident from the appearance of bands at 6μ and 6.2μ in the infra-red spectrum and the appearance of an absorption band at 240 mμ in the ultraviolet spectrum.

Thus, steroids derived from 3-keto-Δ⁴-pregnene are obtained.

A solution of 1 g. of paravallarine in 15 cc. of methylene chloride is mixed with a solution of 600 mg. of N-chlorosuccinimide in 15 cc. of methylene chloride and the mixture is stirred for 15 minutes at a temperature in the region of 0° C. After standing for 45 minutes at an ambient temperature, the reaction solution is washed with 50 cc. of water four times, it is dried over dry sodium sulphate and distilled at a temperature below 40° C. The white residue is dried for 1 hour at 20° C., under a vacuum of 0.01 mm. Hg, and it is treated under reflux for 30 minutes with 25 cc. of a solution of sodium ethanolate in ethanol.

A white dense precipitate is observed, this forming as soon as heating is commenced. The reaction solution, which is yellow in colour, is then poured into 150 cc. of a 1% sulphuric acid solution and the precipitate formed is extracted with ether.

There are obtained 305 mg. of a light yellow dry residue. The acid solution is then heated for 30 minutes at 100° C., on a water bath and a second precipitate is obtained and extracted with chloroform.

320 mg. of a brownish-yellow residue are produced.

The chromatography of a benzene solution of the first residue provides, by elution with the same solvent, 58 mg. of a white product which is recrystallised from acetone to form needles; it melts at 198–200° C.; its rotatory power is $[\alpha]_D^{20} = +92° \pm 2$ (c.=0.152 chloroform).

The infra-red spectrum of this product is given in the curve shown in FIG. 1 of the accompanying drawings and it is possible to observe characteristic bands at 5.7μ (lactone) 6.0 and 6.2μ (unsaturated ketone).

Analysis of the product, for an empirical formula of $C_{21}H_{28}O_3$, gives—

Calculated: C=76.79%, H=8.59%, O=14.61%.
Found: C=76.59%, H=8.54%, O=14.88%.

Chromatography of the benzenic solution of the second residue (320 mg.), as before, supplies by elution with the same solvent 27 mg. of the same product which melts at 198–200° C.

EXAMPLE 2

Preparation of (20S)-3-keto-20-hydroxy-18-oic lactone (→20)-allopregnane

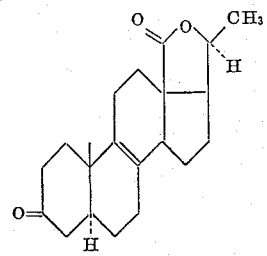

A solution of 1 g. of dihydroparavallarine in 15 cc. of methylene chloride is mixed with a solution of 650 mg. of N-chlorosuccinimide in 15 cc. of methylene chloride. The mixture is stirred for 15 minutes at a temperature in the region of 0° C. After standing for 1 hour at ordinary temperature, the reaction solution is washed three times with 50 cc. of water. It is dried over sodium sulphate and it is subjected to vacuum distillation at a temperature below 40° C. The white residue of chloramine is then dried for 1 hour at ordinary temperature and at 0.01 mm. Hg. It is then heated under reflux for 15 minutes with 25 cc. of sodium ethanolate solution in ethanol.

The reaction solution containing a precipitate of sodium chloride in suspension is poured into 150 cc. of a 1% sulphuric acid solution. The precipitate formed is extracted with ether and 650 mg. of deaminated product are obtained. After heating for an hour on a water bath, the sulphuric acid mother liquors are extracted afresh with chloroform and a second quantity of 190 mg. of deaminated product is thus obtained.

The combination of the products thus isolated and placed in benzonic solution are subjected to chromatography on 12 g. of alumina. The benzene extract yields 494 mg. of a white product (giving a yellow precipitate immediately with a solution of 2,4-dinitrophenyl hydrazine). By recrystallisation from ether, there is obtained a first quantity of 260 mg. of the ketone corresponding to the above formula, this melting at 178° C. By concentration of the mother liquors, there are obtained 90 mg. of a second quantity, having the same melting point. The rotatory power of this product is $[\alpha]_D^{20} = +17° \pm 2$ (c.=0.23 chloroform).

The infra-red spectrum of this product is shown in FIG. 2 of the accompanying drawings and a lactone band is observed at 5.75μ and a ketone band at 5.9μ.

Analysis of this product, for an empirical formula of $C_{21}H_{30}O_3$, gives—

Calculated: C=76.32%, H=9.15%, O=14.53%.
Found: C=76.15%, H=8.95%, O=14.59%.

EXAMPLE 3

Preparation of (20S)-3β,20-dihydroxy-18-oic lactone-(→20)-allopregnane

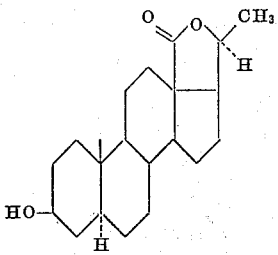

The ketone obtained according to the preceding example is reduced with potassium borohydride in methanol and the alcohol of the above formula is obtained.

To produce the compound, 300 mg. of the ketone of Example 2 are dissolved in 25 cc. of methanol and the solution is stirred for 1 hour with 1 gram of potassium borohydride. The reaction solution is poured into 75 cc.

of water and the precipitate formed is extracted with ether.

302 mg. of product are recovered and, by crystallisation from a mixture of acetone and hexane, 250 mg. of the alcohol corresponding to the above formula are obtained.

The product melts at 146° C.

Its rotatory power is $[\alpha]_D^{20}=0°\pm2$ (c.=0.7 chloroform).

Figure 3:
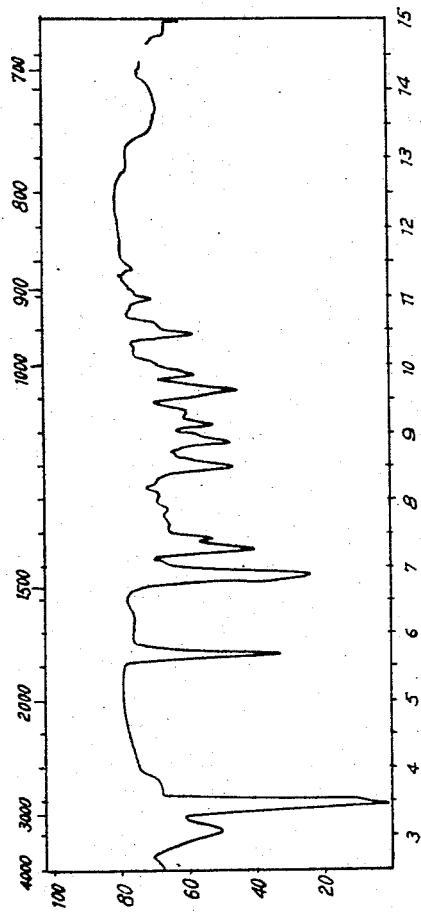

The infra-red spectrum of this product is shown in FIG. 3 of the accompanying drawings and an OH band is observed at $3.05\mu$ and a lactone band at $5.7\mu$.

Analysis of this product, for an empirical formula of $C_{21}H_{32}O_3$, gives—

Calculated: C=75.86%, H=9.70%, O=14.44%.
Found: C=75.54%, H=9.65%, O=14.52%.

EXAMPLE 4

*Preparation of (20S)-3-(β-acetoxy)-20-hydroxy-18-oic lactone(→20)-allopregnane*

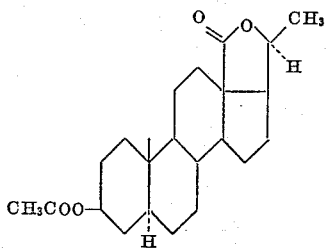

The alcohol obtained in Example 3 is acetylated with acetic anhydride and the monoacetylated derivative corresponding to the above formula is obtained.

For this purpose, 150 mg. of alcohol are heated for 2 hours at 100° C. with 3 cc. of acetic anhydride. The excess of reagent is distilled off in vacuo and the residue is crystallised from a mixture of acetone and hexane. There are thus obtained 130 mg. of the acetylated derivative corresponding to the above formula. Its melting point is 198° C.

Its rotatory power is $[\alpha]_D^{20}=-11°\pm2$ (c.=0.69 chloroform).

Figure 4:
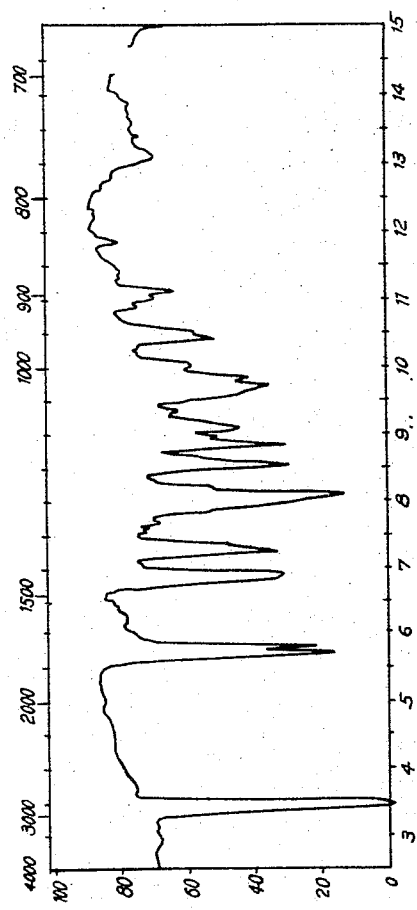

Its infra-red spectrum is shown in FIG. 4 of the accompanying drawings, and a lactone band can be seen at $5.72\mu$ and an ester band at $5.82\mu$.

Analysis of the product, for an empirical formula of $C_{23}H_{34}O_4$, gives—

Calculated: C=73.76%, H=9.15%, O=17.09%.
Found: C=73.75%, H=8.95%, O=17.09%.

I claim:

1. In a process of producing 3-keto steroid compounds of the formula

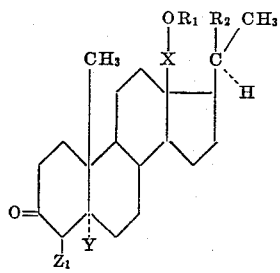

wherein
X is a member selected from the group consisting of methylene and carbonyl;
$R_1$ is a member selected from the group consisting of hydrogen, methyl, and acetyl;
$R_2$ is a member selected from the group consisting of hydroxyl, acetoxy, and, together with $R_1$, forming a direct oxygen to carbon bond, to complete a five-membered ring; and
Y and $Z_1$ are members selected from the group consisting of hydrogen and a direct carbon to carbon bond,
the steps which comprise chlorinating the steroid compound of the formula

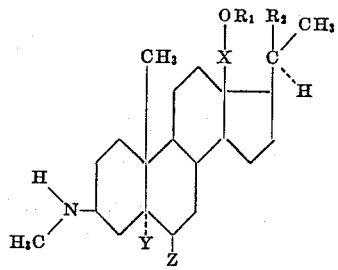

wherein
X, $R_1$ and $R_2$ represent the same members as indicated above, while Y and Z are members selected from the group consisting of hydrogen and a direct carbon to carbon bond,
to form the 3-(N-chloro-N-methyl amino) compound and treating said 3-(N-chloro-N-methyl amino) compound with a solution of an alkali metal alcoholate in an anhydrous alcohol to convert the chloro methylamino group into the keto group.

2. In a process of producing (20S)-3-keto-20-hydroxy-18-oic lactone(→20)-pregna-4-ene, the steps which comprise chlorinating the steroid compound of the formula

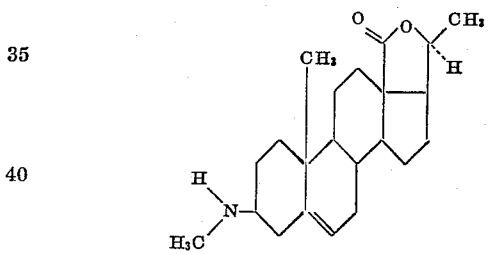

to form the 3-(N-chloro-N-methyl amino) compound and treating said 3-(N-chloro-N-methyl amino) compound with a solution of an alkali metal alcoholate in an anhydrous alcohol to convert the chloro methylamino group into the keto group.

3. The process according to claim 1, wherein chlorination is effected by reaction with a chlorinating agent selected from the group consisting of N-chloro succinimide and hypochlorous acid in an anhydrous organic solvent.

4. In a process of producing (20S)-3-keto-20-hydroxy-18-oic lactone(→20)-pregna-4-ene, the steps which comprise treating the steroid compound of the formula

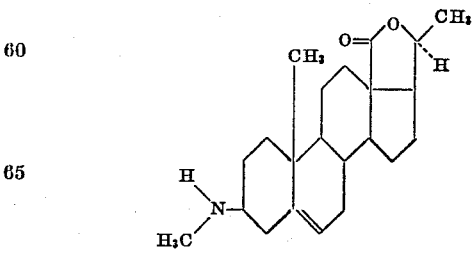

with N-chloro succinimide in an anhydrous organic solvent to form the 3-(N-chloro-N-methyl amino) compound and treating said 3-(N-chloro-N-methyl amino) compound with a solution of an alkali metal alcoholate in an anhydrous alcohol to convert the chloro methylamino group into the keto group.

5. In a process of producing (20S)-3-keto-20-hydroxy-18-oic lactone(→20)-allopregnane, the steps which comprise chlorinating the steroid compound of the formula

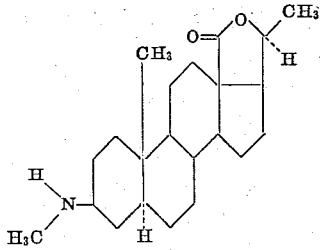

to form the 3-(N-chloro-N-methyl amino) compound and treating said 3-(N-chloro-N-methyl amino) compound with a solution of an alkali metal alcoholate in an anhydrous alcohol to convert the chloro methylamino group into the keto group.

6. In a process of producing (20S)-3-keto-20-hydroxy-18-oic lactone(→20)-allopregnane, the steps which comprise treating the steroid compound of the formula

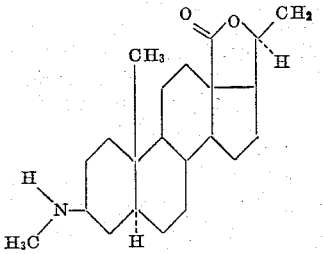

with N-chloro succinimide in an anhydrous organic solvent to form the 3-(N-chloro-N-methyl amino) compound and treating said 3-(N-chloro-N-methyl amino) compound with a solution of an alkali metal alcoholate in an anhydrous alcohol to convert the chloro methylamino group into the keto group.

7. In a process of producing (20S)-3β,20-dihydroxy-18-oic lactone(→20)-allopregnane, the step which comprises reacting (20S)-3-keto-20-hydroxy-18-oic lactone(→20)-allopregnane with a solution of an alkali metal borohydride in methanol.

8. In a process of producing (20S)-3β-acetoxy-20-hydroxy-18-oic lactone(→20)-allopregnane, the step which comprises reacting (20S)-3-keto-20-hydroxy-18-oic lactone(→20)-allopregnane with a solution of an alkali metal borohydride in methanol, and acetylating the resulting 3,20-dihydroxy compound.

References Cited

UNITED STATES PATENTS 3,161,636   12/1964   Le Men _____ 260—239.57

LEWIS GOTTS, *Primary Examiner.*

LESLIE H. GASTON, M. LIEBMAN,
ELBERT L. ROBERTS, *Examiners.*

H. A. FRENCH, *Assistant Examiner.*